(12) United States Patent
Hetrich et al.

(10) Patent No.: US 10,328,294 B2
(45) Date of Patent: Jun. 25, 2019

(54) LOAD INDICATOR FOR A FALL PROTECTION APPARATUS

(71) Applicant: MSA Technology, LLC, Cranberry Township, PA (US)

(72) Inventors: Mitchell H. Hetrich, Greenville, PA (US); Mark Hall, Natrona Heights, PA (US); Jeffrey Wu, Suzhou (CN); David Bao, Wuxi (CN); James Zhan, Jiangsu Province (CN); Jim Zhan, Jiangsu (CN)

(73) Assignee: MSA Technology, LLC, Cranberry Township, PA (US)

( * ) Notice: Subject to any disclaimer, the term of this patent is extended or adjusted under 35 U.S.C. 154(b) by 240 days.

(21) Appl. No.: 15/233,618

(22) Filed: Aug. 10, 2016

(65) Prior Publication Data
US 2017/0291049 A1    Oct. 12, 2017

Related U.S. Application Data

(60) Provisional application No. 62/321,591, filed on Apr. 12, 2016.

(51) Int. Cl.
*A62B 35/00* (2006.01)
*G01L 5/04* (2006.01)

(52) U.S. Cl.
CPC ...... *A62B 35/0093* (2013.01); *A62B 35/0037* (2013.01); *A62B 35/0043* (2013.01); *A62B 35/0075* (2013.01); *G01L 5/047* (2013.01)

(58) Field of Classification Search
CPC ............ A62B 35/0093; A62B 35/0037; A62B 35/0043; A62B 35/0075; G01L 5/047
See application file for complete search history.

(56) References Cited

U.S. PATENT DOCUMENTS

| 892,896 | A | * | 7/1908 | Rowland | ................ A62B 35/04 114/199 |
| 2,679,228 | A | * | 5/1954 | Gryce | ..................... B66C 15/00 116/212 |

(Continued)

FOREIGN PATENT DOCUMENTS

| FR | 2755236 A1 | * | 4/1998 | ............. A62B 35/04 |
| WO | WO-9747359 A1 | * | 12/1997 | ............. A62B 35/04 |
| WO | WO-2005079922 A1 | * | 9/2005 | ......... A62B 35/0068 |

*Primary Examiner* — Alvin C Chin-Shue
*Assistant Examiner* — Candace L Bradford
(74) *Attorney, Agent, or Firm* — The Webb Law Firm

(57) ABSTRACT

A load indicator for use with a fall protection apparatus having a line and a connector for connecting to a user includes a housing having a pass-through opening and a covered indicator region. At least a portion of the housing is configured for connecting to the line. The load indicator also includes a shear pin supported by the housing and extending across the pass-through opening, and a saddle extending across at least a portion of the pass-through opening and supported by at least a portion of the shear pin. The saddle is configured for connecting to at least a portion of the connector. The saddle is movable relative to the housing between a first position and a second position when a force exceeding a predetermined threshold value is applied on the saddle causing the shear pin to shear or break. At least a portion of the indicator region is uncovered in the second position of the saddle when the shear pin shears or breaks.

20 Claims, 7 Drawing Sheets

(56) References Cited

U.S. PATENT DOCUMENTS

| | | | | |
|---|---|---|---|---|
| 3,177,544 A * | 4/1965 | Nelson | A62B 35/04 | 182/5 |
| 3,533,655 A * | 10/1970 | Harley | A62B 1/04 | 294/82.34 |
| 4,265,179 A * | 5/1981 | Tupper | B61B 12/06 | 104/115 |
| 4,462,316 A * | 7/1984 | Tupper | A62B 35/04 | 104/182 |
| 5,090,503 A * | 2/1992 | Bell | A62B 35/04 | 182/5 |
| 5,219,039 A * | 6/1993 | Bell | A62B 35/04 | 182/3 |
| 5,220,977 A | 6/1993 | Wolner | | |
| 5,400,868 A * | 3/1995 | Ellis | A63C 11/00 | 182/18 |
| 5,458,214 A * | 10/1995 | Olson | A62B 35/0056 | 182/18 |
| 5,655,476 A * | 8/1997 | Wolter | B66C 1/125 | 116/212 |
| 7,424,996 B2 * | 9/2008 | Larsen | G01L 5/101 | 116/212 |
| 8,511,434 B2 * | 8/2013 | Blomberg | H02K 49/043 | 182/100 |
| 9,174,073 B2 * | 11/2015 | Casebolt | A62B 35/0025 | |
| 9,791,357 B2 * | 10/2017 | Myers | G01L 5/047 | |
| 9,913,999 B2 * | 3/2018 | Balquist | A62B 35/0093 | |
| 2003/0006094 A1 * | 1/2003 | Cole | A62B 35/0056 | 182/3 |
| 2010/0199471 A1 * | 8/2010 | Millar | A62B 35/0075 | 24/599.1 |
| 2010/0226748 A1 * | 9/2010 | Wolner | A62B 35/0093 | 414/815 |
| 2010/0326767 A1 * | 12/2010 | Guthrie | A62B 35/0037 | 182/3 |
| 2011/0278095 A1 * | 11/2011 | Hetrich | A62B 1/10 | 182/231 |
| 2018/0147428 A1 * | 5/2018 | Balquist | A62B 35/0093 | |

* cited by examiner

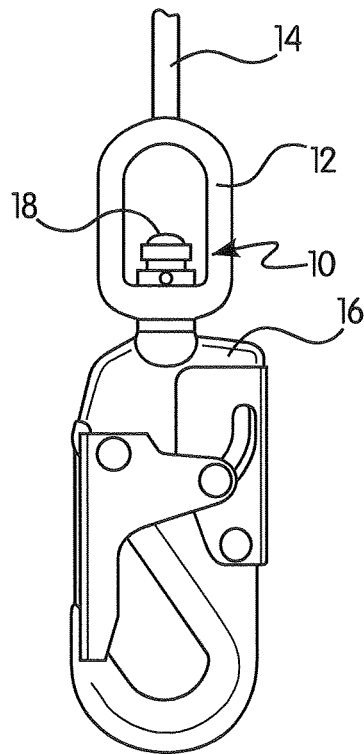
FIG. 9
(Prior Art)
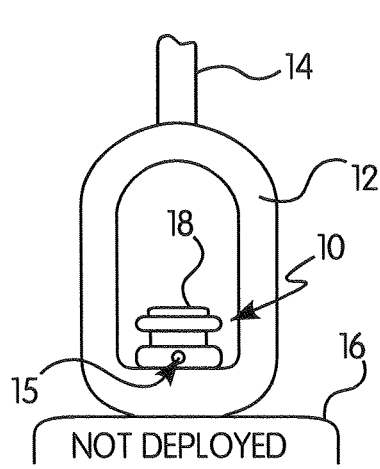 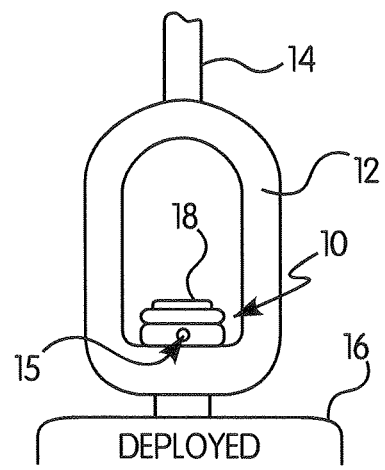
FIG. 10A
(Prior Art)
FIG. 10B
(Prior Art)

LOAD INDICATOR FOR A FALL PROTECTION APPARATUS

CROSS REFERENCE TO RELATED APPLICATION

This application claims the benefit of priority from U.S. Provisional Patent Application No. 62/321,591, filed Apr. 12, 2016, which is incorporated by reference in its entirety.

BACKGROUND OF THE INVENTION

Field of the Invention

The present invention relates generally to a load indicator for a fall protection apparatus, and, more particularly, to a load indicator for a self-retracting lanyard ("SRL") used as a fall arrest device.

Description of Related Art

In general, an SRL is a type of a fall protection apparatus used to protect a user from injury during an accidental fall from an elevated position. The SRL typically has an internal drum with a line, such as a cable or a rope, wrapped around the drum. The drum is directly or indirectly connected to a fixed point, such as an overhead beam, while a free end of the line is connected to the user, such as by a connector to a harness worn by the user. During normal use, the drum can rotate to allow the line to pay out of the drum or retract back around the drum. Further, the drum is biased to retract the line back into the SRL.

The SRL is configured to control an accidental fall of the user from an elevated position. The SRL is provided with a speed-sensitive mechanism that is configured for detecting the speed of the line as it is paid out from the drum. If the user falls from the elevated position, the speed-sensitive mechanism activates a braking mechanism to arrest the fall by bringing the user to a gradual, controlled stop.

When the SRL is subjected to a shock load, such as from arresting a fall, the SRL should be inspected and replaced, if necessary, because the shock load of a falling user may weaken or damage the SRL. In order to detect whether the SRL has been subjected to a shock load that may require the SRL to be replaced, the SRL typically includes a load indicator device. With reference to FIG. 9, an existing load indicator 10 is installed on a link 12 that connects a line 14 with a connector 16, such as a carabiner or the like, which may be connected to a harness (not shown) worn by the user. The link 12 is slidable on a shaft 18 between a first, inactivated position and a second, activated position after a force exerted on the line 14 exceeds a predetermined threshold value. As the force exerted on the line 14 exceeds the predetermined threshold value, the link 12 shears a shear pin 15 and slides away from the connector 16. The predetermined threshold value of the force that causes the link 12 to slide from the first, inactivated position (FIG. 10A) to the second, activated position (FIG. 10B) is selected based on a typical force that may be exerted on the line 14 as a result of an accidental fall of the user from an elevated position which activates the braking mechanism of the SRL. The condition of the load indicator 10 may be inspected by observing the position of the link 12 relative to the shaft 18. The load indicator 10 with a link 12 in an activated position (FIG. 10B) indicates that the SRL has arrested a fall and the line 14 and the SRL needs to be inspected, repaired, and/or replaced.

Conventional load indicators may have a number of disadvantages. In some instances, the load indicator can be inadvertently activated as a result of rough handling of the line and/or the connector. In other cases, even when the load indicator is activated by arresting a fall, it may be difficult to visually identify that the link 12 has moved from the inactivated state (FIG. 10A) to the activated state (FIG. 10B). Accordingly, there is a need in the art for an improved load indicator.

SUMMARY OF THE INVENTION

Generally, provided is an improved load indicator that prevents inadvertent activation and reliably indicates whether the SRL has been subjected to shock loading, such as from a fall.

In one preferred and non-limiting embodiment or aspect, provided is a load indicator for a fall protection apparatus having a line and a connector for connecting to a user. The load indicator may include a housing having a pass-through opening and a covered indicator region. At least a portion of the housing may be configured for connecting to the line. The load indicator may include a shear pin supported by the housing and extending across the pass-through opening and a saddle extending across at least a portion of the pass-through opening and supported by at least a portion of the shear pin. The saddle may be configured for connecting to at least a portion of the connector. The saddle may be movable relative to the housing between a first position and a second position when a force exceeding a predetermined threshold value is applied on the saddle causing the shear pin to shear or break. At least a portion of the indicator region may be uncovered in the second position of the saddle.

In one preferred and non-limiting embodiment or aspect, the load indicator may have an indicator cover connected to at least a portion of the saddle, such that the indicator cover covers the indicating region in the first position of the saddle and uncovers the at least a portion of the indicator region in the second position of the saddle. The indicator cover may have a mounting structure for releasably connecting the indicator cover to the saddle. The indicator cover may define an interior cavity shaped to receive at least a portion of the indicator region of the housing. The housing may have a first guide member and the indicator cover may have a second guide member for guiding a movement of the indicator cover to uncover the at least a portion of the indicator region with movement of the saddle from the first position to the second position.

In one preferred and non-limiting embodiment or aspect, the shear pin may have an elongated, substantially cylindrical body with a first end and a second end offset from the first end along a longitudinal axis. The first end and the second end of the shear pin may be received within a receiving space on the housing. The shear pin may have one or more circumferential grooves recessed into the body between the first end and the second end. At least a portion of the body of the shear pin may be solid or hollow.

In one preferred and non-limiting embodiment or aspect, the saddle may have an upper end with a grooved portion shaped to engage at least a portion of the connector. The saddle may have a lower end with a recess for receiving at least a portion of the shear pin. The recess may be oriented substantially perpendicularly to a direction of the grooved portion. The lower end of the saddle may be offset from a bottom of the pass-through opening of the housing. The saddle may have a pair of lugs protruding from the lower end with a space between the lugs. A retaining pin may be retained between the pair of lugs. The housing may have a unitary, monolithic structure. The housing may have a first portion and a second portion releasably connected together to surround at least a portion of an outer circumference of the line.

In one preferred and non-limiting embodiment or aspect, a load indicator for use with a fall protection apparatus having a line and a connector for connecting to a user may include a housing having a pass-through opening and an indicator region. The housing may be configured for connecting to the line. The load indicator may include a shear pin supported by the housing and extending across the pass-through opening, and a saddle extending through at least a portion of the pass-through opening and supported by at least a portion of the shear pin. The saddle may be configured for connecting to at least a portion of the connector. The load indicator may also have an indicator cover movable relative to the housing between a first position, where the indicator cover covers the indicator region, and a second position, where the indicator cover uncovers at least a portion of the indicator region. The indicator cover may be movable to the second position when a force exceeding a predetermined threshold value is applied to the saddle to shear or break the shear pin.

In one preferred and non-limiting embodiment or aspect, a fall protection apparatus may include a line having a first end and a second end, a connector for connecting to a user, and a load indicator positioned between the second end of the line and the connector. The load indicator may include a housing having a pass-through opening and a covered indicator region. At least a portion of the housing may be configured for connecting to the second end of the line. The load indicator may include a shear pin supported by the housing and extending across the pass-through opening, and a saddle extending across at least a portion of the pass-through opening and supported by at least a portion of the shear pin. The saddle may be configured for connecting to at least a portion of the connector. The saddle may be movable relative to the housing between a first position and a second position when a force exceeding a predetermined threshold value is applied on the saddle causing the shear pin to shear or break. At least a portion of the indicator region may be uncovered in the second position of the saddle. The load indicator may further include an indicator cover connected to at least a portion of the saddle such that the indicator cover covers the indicating region in the first position of the saddle and uncovers the at least a portion of the indicator region in the second position of the saddle.

Further preferred and non-limiting embodiments or aspects will now be described in the following numbered clauses.

Clause 1: A load indicator for use with a fall protection apparatus having a line and a connector for connecting to a user, the load indicator comprising: a housing having a pass-through opening and a covered indicator region, at least a portion of the housing connected to the line; a shear pin supported by the housing and extending across the pass-through opening; and a saddle extending across at least a portion of the pass-through opening and supported by at least a portion of the shear pin, the saddle connected to at least a portion of the connector, wherein the saddle is movable relative to the housing between a first position and a second position when a force exceeding a predetermined threshold value is applied on the saddle causing the shear pin to shear or break, and wherein at least a portion of the indicator region is uncovered in the second position of the saddle when the shear pin shears or breaks.

Clause 2: The load indicator of clause 1, further comprising an indicator cover connected to at least a portion of the saddle such that the indicator cover covers the indicating region in the first position of the saddle and uncovers the at least a portion of the indicator region in the second position of the saddle.

Clause 3: The load indicator of clauses 1 or 2, wherein the indicator cover has a mounting structure for releasably connecting the indicator cover to the saddle.

Clause 4: The load indicator of any of clauses 1-3, wherein the indicator cover defines an interior cavity shaped to receive at least a portion of the indicator region of the housing.

Clause 5: The load indicator of any of clauses 1-4, wherein the housing has a first guide member and the indicator cover has a second guide member for guiding a movement of the indicator cover to uncover the at least a portion of the indicator region with movement of the saddle from the first position to the second position.

Clause 6: The load indicator of any of clauses 1-5, wherein the shear pin has an elongated, substantially cylindrical body with a first end and a second end offset from the first end along a longitudinal axis.

Clause 7: The load indicator of any of clauses 1-6, wherein the first end and the second end of the shear pin are received within a receiving space on the housing.

Clause 8: The load indicator of any of clauses 1-7, wherein the shear pin comprises one or more circumferential grooves recessed into the body between the first end and the second end.

Clause 9: The load indicator of any of clauses 1-8, wherein at least a portion of the body of the shear pin is solid or hollow.

Clause 10: The load indicator of any of clauses 1-9, wherein the saddle has an upper end with a grooved portion shaped to engage at least a portion of the connector.

Clause 11: The load indicator of any of clauses 1-10, wherein the saddle has a lower end with a recess for receiving at least a portion of the shear pin.

Clause 12: The load indicator of any of clauses 1-11, wherein the recess is oriented substantially perpendicularly to a direction of the grooved portion.

Clause 13: The load indicator of any of clauses 1-12, wherein the lower end of the saddle is offset from a bottom of the pass-through opening of the housing.

Clause 14: The load indicator of any of clauses 1-13, wherein the saddle has a pair of lugs protruding from the lower end with a space between the lugs.

Clause 15: The load indicator of any of clauses 1-14, wherein a retaining pin is retained between the pair of lugs.

Clause 16: The load indicator of any of clauses 1-15, wherein the housing has a unitary, monolithic structure.

Clause 17: The load indicator of any of clauses 1-16, wherein the housing comprises a first portion and a second portion releasably connected together to envelop at least a portion of an outer circumference of the line.

Clause 18: A load indicator for use with a fall protection apparatus having a line and a connector for connecting to a user, the load indicator comprising: a housing having a pass-through opening and an indicator region, the housing connected to the line; a shear pin supported by the housing and extending across the pass-through opening; a saddle extending through at least a portion of the pass-through opening and supported by at least a portion of the shear pin, the saddle connected to at least a portion of the connector; an indicator cover movable relative to the housing between a first position, where the indicator cover covers the indicator region, and a second position, where the indicator cover uncovers at least a portion of the indicator region, wherein the indicator cover is moved to the second position when a force exceeding a predetermined threshold value is applied to the saddle to shear or break the shear pin.

Clause 19: A fall protection apparatus comprising: a line having a first end and a second end; a connector for connecting to a user; and a load indicator positioned between the second end of the line and the connector, the load indicator comprising: a housing having a pass-through opening and a covered indicator region, at least a portion of the housing connected to the second end of the line; a shear pin supported by the housing and extending across the pass-through opening; and a saddle extending across at least a portion of the pass-through opening and supported by at least a portion of the shear pin, the saddle connected to at least a portion of the connector, wherein the saddle is movable relative to the housing between a first position and a second position when a force exceeding a predetermined threshold value is applied on the saddle causing the shear pin to shear or break, and wherein at least a portion of the indicator region is uncovered in the second position of the saddle.

Clause 20: The fall protection apparatus of clause 19, further comprising an indicator cover connected to at least a portion of the saddle such that the indicator cover covers the indicating region in the first position of the saddle and uncovers the at least a portion of the indicator region in the second position of the saddle.

These and other features and characteristics of the load indicator for use with a fall protection apparatus, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. As used in the specification and the claims, the singular form of "a", "an", and "the" include plural referents unless the context clearly dictates otherwise.

BRIEF DESCRIPTION OF THE DRAWINGS

FIG. 9 is a side view of a load indicator for use with a fall protection device in accordance with a prior art embodiment;

FIG. 10A is a detailed view of the load indicator shown in FIG. 9 in a first, inactivated state;

FIG. 10B is a detailed view of the load indicator shown in FIG. 9 in a second, activated state.

DETAILED DESCRIPTION OF THE INVENTION

Figure 1:
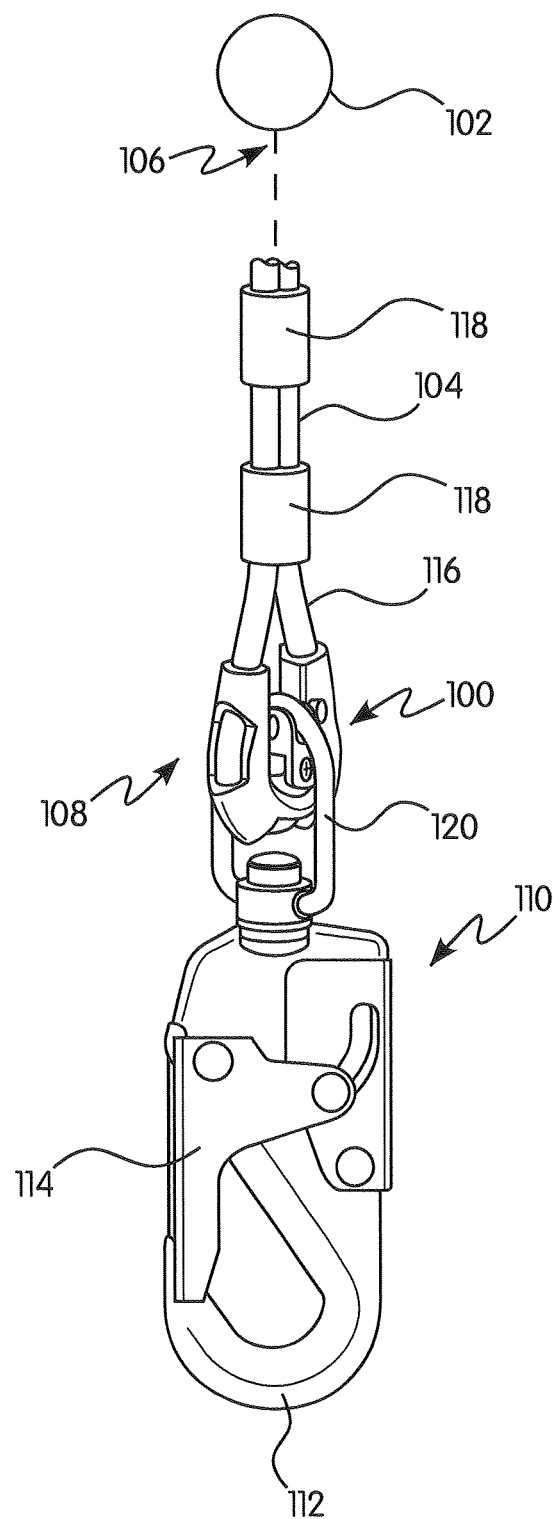
FIG. 1 is a perspective view of a load indicator for use with a fall protection apparatus in accordance with the principles of the present invention.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. It is to be understood, however, that the disclosure may assume alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting.

Referring to the drawings in which like reference characters refer to like parts throughout the several views thereof, the present disclosure is generally directed to a load indicator for a fall protection apparatus, and, more particularly, to a load indicator for an SRL used as part of a controlled descent device. With initial reference to FIG. 1, a load indicator 100 configured for use with a fall protection apparatus 102 is shown in accordance with one preferred and non-limiting aspect. The fall protection apparatus 102 may be configured for use in industrial environments and recreational activities. The fall protection apparatus 102 can be implemented in any appropriate application or environment where a user or worker engages in activities in an elevated position and requires protection in the event of a fall. The fall protection apparatus 102 protects the user should an unintentional, accidental fall commence. The fall protection apparatus 102 is configured to prevent the user from falling too far or stopping too quickly, such as by activation of a speed-liming mechanism and a braking mechanism (not shown). In one preferred and non-limiting aspect, the fall protection apparatus 102 may be in the form of an SRL.

With continued reference to FIG. 1, the fall protection apparatus 102 has a line 104 having a first end 106 connected to a drum (not shown) of the SRL and a second end 108 opposite the first end 106 and connected to a connector 110, such as a carabiner or the like, configured for connection to the user, such as to a harness (not shown) worn by the user. The housing of the SRL may be fixedly secured to a static structure, such as an overhead beam. In some aspects, the connector 110 may be a carabiner having a hook portion 112 for connecting to the user's harness and a safety lock 114 for preventing the harness from unintentionally detaching from the hook portion 112. The safety lock 114 is manually operable to allow at least a portion of the harness to be engaged with the hook portion 112, thereby connecting the harness (and the user) to the SRL. In some preferred and non-limiting aspects, the line 104 may be a cable, webbing, strap, or other elongated material configured for connecting the user to the fall protection apparatus 102. The line 104 may be retractable into the drum of the SRL.

With continued reference to FIG. 1, the second end 108 of the line 104 has a looped portion 116 where a terminal portion of the line 104 is looped and connected to another portion of the line 104, such as by one or more ferrules 118, to prevent the looped portion 116 from unraveling. The looped portion 116 receives a link 120 of the connector 110 such that the link 120 passes through the looped portion 116 of the line 104.

In one preferred and non-limiting embodiment or aspect, the load indicator 100 is associated with the line 104 and the connector 110 at the interface between the looped portion 116 of the line 104 and the link 120 of the connector 110. As described herein, at least a portion of the load indicator 100 is movable between a first, inactivated position and a second, activated position when the load indicator 100 has been subjected to a shock load, such as the load of the falling user. In some aspects, at least a portion of the load indicator 100 moves between the first, inactivated position and the second, activated position after a force exerted on the line 104 exceeds a predetermined threshold value. The predetermined threshold value of the force that causes at least a portion of the load indicator 100 to move from the first, inactivated position to the second, activated position is selected based on a typical force that may be exerted on the line 104 as a result of an accidental fall of the user from an elevated position which activates the braking mechanism of the SRL.

Figure 2:
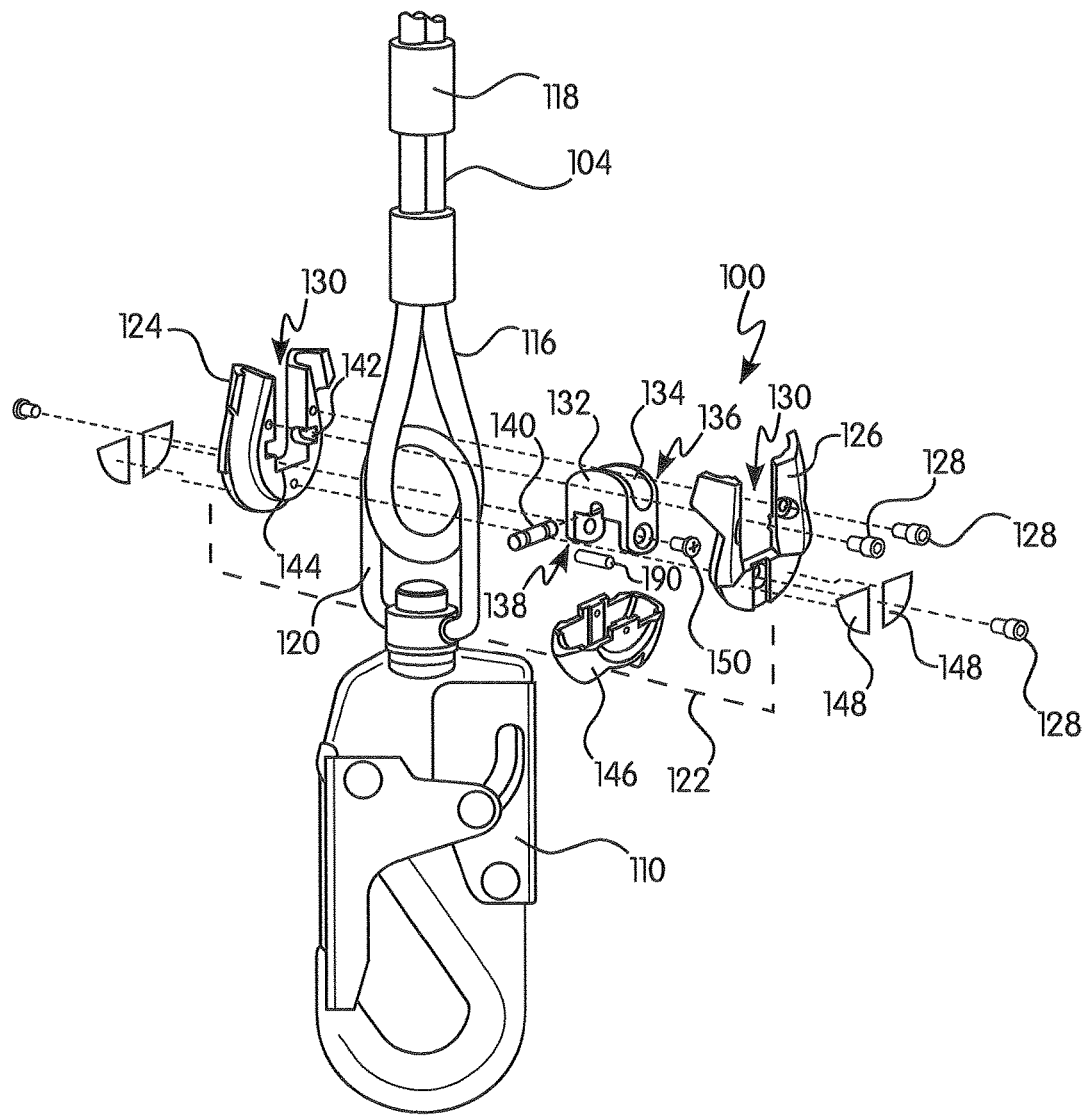
FIG. 2 is an exploded perspective view of the load indicator shown in FIG. 1.
Figure 11:
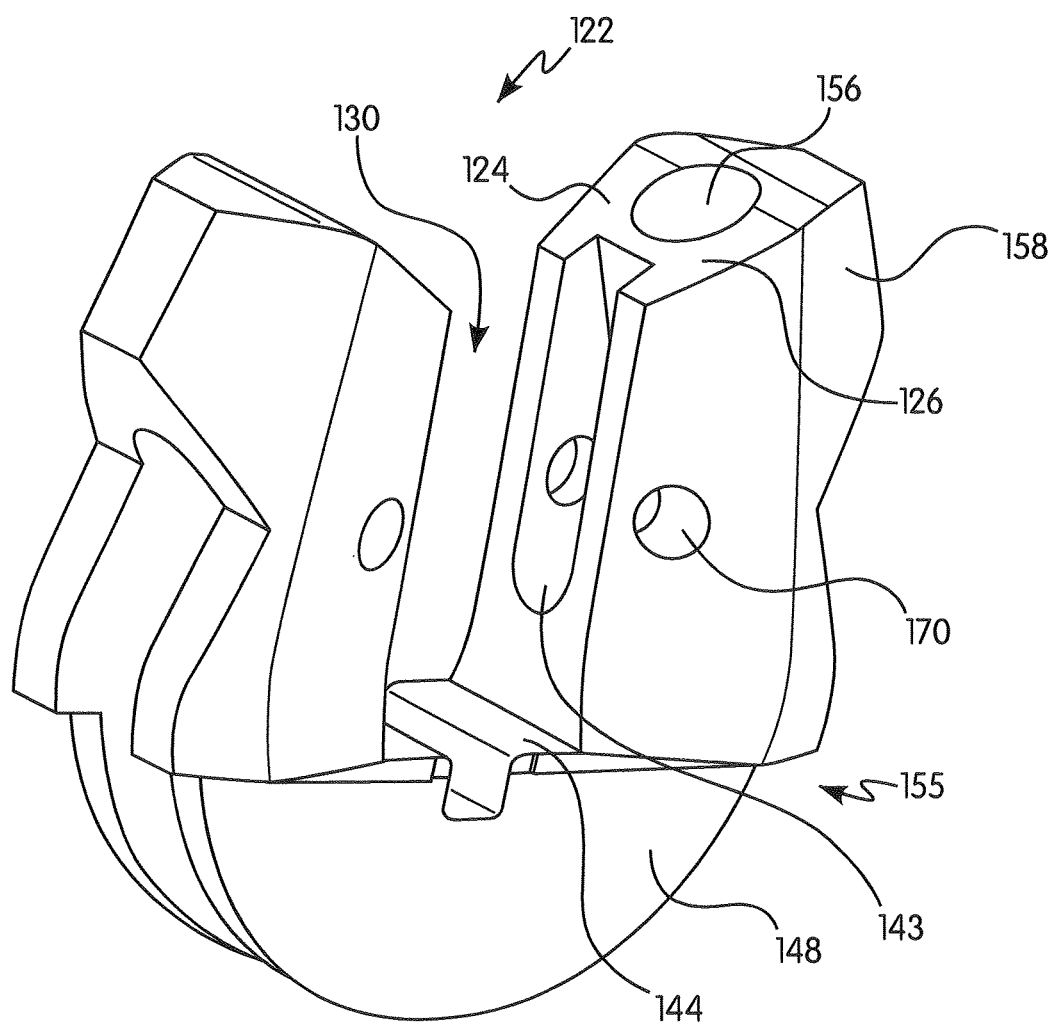
FIG. 11 is a perspective view of a thimble for a load indicator in accordance with another aspect of the present invention.

With reference to FIG. 2, an exploded view of one preferred and non-limiting embodiment or aspect of the load indicator 100 illustrated in FIG. 1 is shown. The load indicator 100 generally includes a load indicator housing, such as a thimble 122, having a first portion 124 and a second portion 126 joined together to envelop or surround at least a section of the looped portion 116 of the line 104. In some aspects, the first portion 124 and the second portion 126 of the thimble 122 may be releasably or non-releasably connected together, such as by one or more fasteners 128. Once connected together, the first portion 124 and the second portion 126 of the thimble 122 are fixed to at least a portion of the looped portion 116 of the line 104. In other aspects, such as shown in FIG. 11, the thimble 122 may have a unitary structure, such as a monolithic structure where the first portion 124 and the second portion 126 are integrally formed together as a single, unitary member. The first and second portions 124, 126 of the thimble 122 define a pass-through opening 130 for receiving a saddle 132. The saddle 132 has a grooved portion 134 on its upper end 136 shaped to correspond to at least a portion of the link 120.

During use, at least a portion of the link 120 engages the saddle 132 by contacting the grooved portion 134. A lower end 138 of the saddle 132 is supported by a shearing element, such as shear pin 140, which is received within a receiving space 142 defined between at least a portion of the thimble 122 and the saddle 132. In this configuration, the lower end 138 of the saddle 132 is offset from a bottom 144 of the pass-through opening 130 of the thimble 122. An indicator cover 146 is connected to at least a portion of the saddle 132, such that the indicator cover 146 is movable with movement of the saddle 132 between a first position, where the indicator cover 146 covers an indicator area or region 148 on at least a portion of the thimble 122, and a second position, where the indicator cover 146 uncovers at least a portion of the indicator region 148 on at least a portion of the thimble 122. In one preferred and non-limiting embodiment or aspect, the indicator cover 146 may be secured to the saddle 132 by one or more retaining screws 150. In another preferred and non-limiting embodiment or aspect, the indicator cover 146 may be secured to the saddle 132 by welding, adhesive, an interference fit, a magnetic fit, or any other mechanical connection. In a further preferred and non-limiting embodiment or aspect, the indicator cover 146 may be monolithically formed with the saddle 132.

Figure 4A:
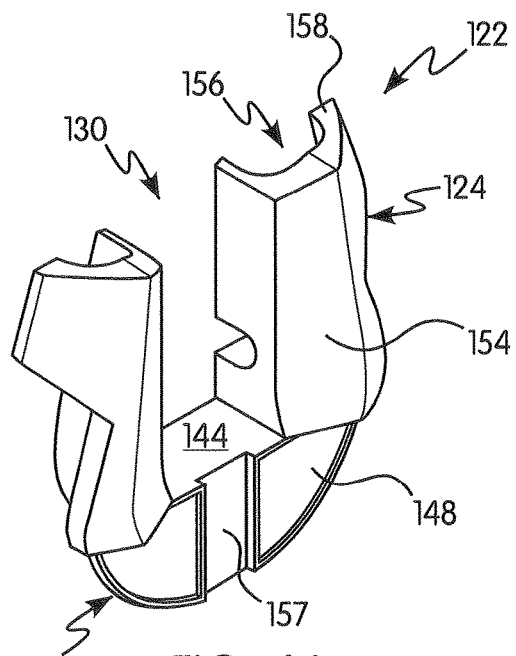
FIG. 4A is a front perspective view of a first portion of a load indicator housing in accordance with the principles of the present invention.
Figure 4B:
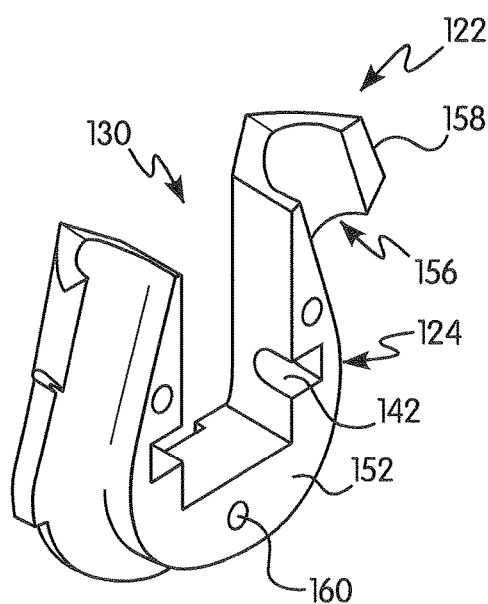
FIG. 4B is a rear perspective view of the first portion of the load indicator housing shown in FIG. 4A.

With reference to FIGS. 4A-4B, front and rear perspective views of the first portion 124 of the thimble 122 shown in FIG. 1 are illustrated. The first portion 124 is substantially U-shaped with an inner face 152 and an outer face 154 opposite the inner face 152. The U-shape of the first portion 124 desirably corresponds to a corresponding U-shape of the looped portion 116 of the line 104 to which the first portion 124 attaches (FIG. 2). The inner face 152 defines a first portion of a pocket 156 for receiving at least a portion of the looped portion 116 of the line 104. Desirably, the pocket 156 is contoured to envelop or surround at least a portion of an outer circumference of the line 104. The pocket 156 may have one or more ears 158 that project away from the pocket 156, such that the ears 158 envelop or surround a greater portion of the line 104 than the pocket itself. In one preferred and non-limiting embodiment or aspect, the pocket 156 may envelop or surround the entire circumference of the line 104. The receiving space 142 is recessed into at least a portion of the inner face 152, such that the location of the receiving space 142 is offset from the bottom 144 of the pass-through opening 130. The receiving space 142 is shaped to receive at least a portion of the shear pin 140, such as one or both ends of the shear pin 140. One or more openings 160 for receiving the corresponding one or more fasteners 128 used to fasten the first portion 124 of the thimble 122 to the second portion 126 and to retain the shear pin 140 extend through at least a portion of the first portion 124 (FIG. 4B). In one preferred and non-limiting embodiment or aspect, the one or more openings 160 extend through the first portion 124 entirely, or at least in part, between the inner face 152 and the outer face 154. The first portion 124 may be made from metal, plastic, or a combination thereof.

With continued reference to FIG. 4A, the outer face 154 may have a recessed region 155 that is recessed into the outer face 154. In one preferred and non-limiting embodiment or aspect, the recessed region 155 may be provided at the same level or below the bottom 144 of the pass-through opening 130. At least a portion of the recessed region 155 defines the indicator region 148. In one preferred and non-limiting embodiment or aspect, at least a portion of the indicator region 148 may be colored differently than the rest of the first portion 124 of the thimble 122. In one preferred and non-limiting embodiment or aspect, the indicator region 148 may have a red color to provide a visual indication that the load indicator 100 has been activated. The indicator region 148 may be formed directly on a face of the recessed region 155, such as by coloring at least a portion of the recessed region 155. In one preferred and non-limiting embodiment or aspect, the indicator region 148 may be formed as a separate element that is applied, such as by adhesion or other mechanical fixing method/mechanism, to at least a portion of the recessed region 155. The recessed region 155 may have a first guiding member 157, such as a groove or a projection, that defines a guide path for guiding a movement of the indicator cover 146 from a covering position (FIG. 3A) to an uncovering position (FIG. 3B) after the load indicator 100 has been activated.

Figure 5A:
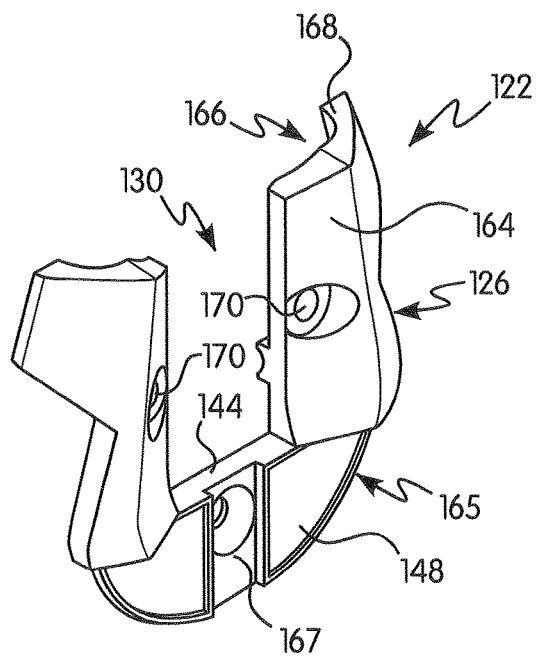
FIG. 5A is a front perspective view of a second portion of a load indicator housing in accordance with the principles of the present invention.
Figure 5B:
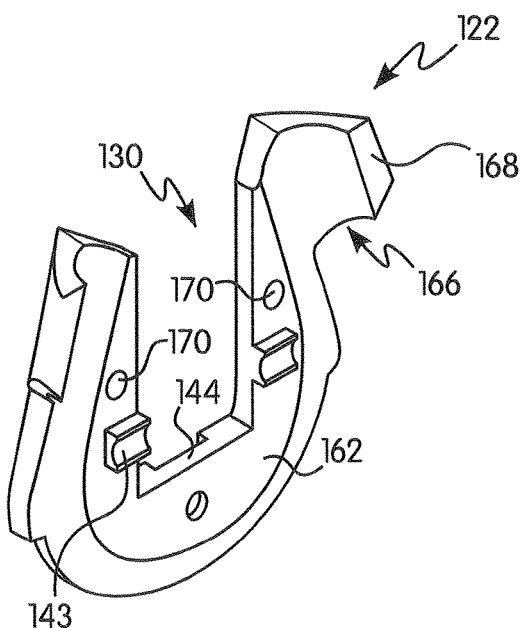
FIG. 5B is a rear perspective view of the second portion of the load indicator housing shown in FIG. 5A.

With reference to FIGS. 5A-5B, front and rear perspective views of the second portion 126 of the thimble 122 shown in FIG. 1 are illustrated. The second portion 126 is substantially U-shaped and corresponds in shape to the first portion 124. In one preferred and non-limiting embodiment or aspect, at least a part of the second portion 126 may be a mirror shape of the first portion 124. The second portion 126 may have an inner face 162 and an outer face 164 opposite the inner face 162. The U-shape of the second portion 126 desirably corresponds to a corresponding U-shape of the looped portion 116 of the line 104 to which the second portion 126 attaches (FIG. 2). The inner face 162 defines a second portion of a pocket 166 for receiving at least a portion of the looped portion 116 of the line 104. Desirably, the pocket 166 is contoured to envelop or surround at least a portion of an outer circumference of the line 104. Together, the pocket 156 on the first portion 124 of the thimble 122 and the pocket 166 on the second portion 126 of the thimble 122 are configured to envelop or surround at least a portion of an outer circumference of the line 104. The pocket 166 may have one or more ears 168 that project away from the pocket 166 such that the ears 168 envelop or surround a greater portion of the line 104 than the pocket itself. In some aspects, the pocket 166 may envelop or surround the entire circumference of the line 104.

In one preferred and non-limiting embodiment or aspect, the ears 158 on the first portion 124 of the thimble 122 and the ears 168 on the second portion 126 of the thimble 122 are configured to completely envelop or surround an outer circumference of the line 104. The second portion 126 has a projection 143 that is configured to receive at least a portion of the shear pin 140, such as one or both ends of the shear pin 140. The projection 143 may extend from at least a portion of the inner face 162 such that the location of the projection 143 is offset from the bottom 144 of the pass-through opening 130. At least a portion of the projection 143 may extend into the receiving space 142 formed on the first portion 124 to retain the shear pin 140 within the receiving space 142. One or more openings 170 for receiving the corresponding one or more fasteners 128 used to fasten the first portion 124 of the thimble 122 to the second portion 126 extend through at least a portion of the second portion 126. In one preferred and non-limiting embodiment or aspect, the one or more openings 170 extend through the second portion 126 entirely, or at least in part, between the inner face 162 and the outer face 164. The second portion 126 may be made from metal, plastic, or a combination thereof.

With continued reference to FIGS. 5A-5B, the outer face 164 may have a recessed region 165 that is recessed into the outer face 164. In some aspects, the recessed region 165 may be provided at the same level or below the bottom 144 of the pass-through opening 130. At least a portion of the recessed region 165 defines the indicator region 148. The indicator cover 146 is configured to cover at least a portion of the recessed region 165. In some aspects the indicator region 148 may be colored differently than the rest of the second portion 126 of the thimble 122. In one exemplary and non-limiting aspect, the indicator region 148 may have a red color to provide a visual indication that the load indicator 100 has been activated. The indicator region 148 may be formed directly on a face of the recessed region 165, such as by coloring at least a portion of the recessed region 165. In other aspects, the indicator region 148 may be formed as a separate element that is applied, such as by adhesion or other mechanical fixing method/mechanism, to at least a portion of the recessed region 165. The recessed region 165 may have a first guiding member 167, such as a groove or a projection, that defines a guide path for guiding a movement of the indicator cover 146 from a covering position (FIG. 3A) to an uncovering position (FIG. 3B) after the load indicator 100 has been activated.

Figure 6:
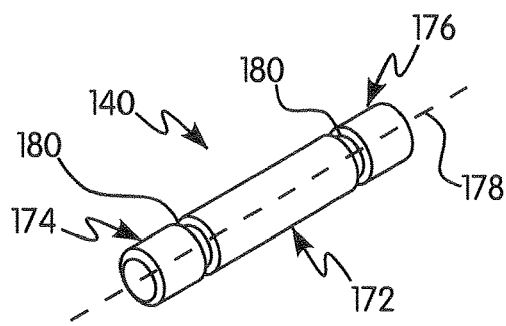
FIG. 6 is a perspective view of a pin for use with a load indicator in accordance with the principles of the present invention.

With reference to FIG. 6, the shear pin 140 is shown in accordance with one preferred and non-limiting embodiment or aspect of the present disclosure. In one preferred and non-limiting embodiment or aspect, the shear pin 140 may be formed as an elongated, substantially cylindrical member having a body 172 with a first end 174 and a second end 176 offset from the first end 174 along a longitudinal axis 178. In other aspects, the shear pin 140 may have an oval, triangular, square, rectangular, or any other multi-sided polygonal shape with linear or curvilinear edges. The cross-section of the body 172 may be uniform or non-uniform along the length of the longitudinal axis 178. At least a portion of the body 172 of the shear pin 140 may be solid or hollow. The shear pin 140 may have one or more grooves 180 recessed into an outer circumference of the body 172 between the first end 174 and the second end 176. The one or more grooves 180 may have a cylindrical, V-shape, or any other geometric shape with linear or curvilinear edges. The location of the one or more grooves 180 may be such that at least one of the grooves 180 is located between the saddle 132 and a sidewall of the pass-through opening 130 of the thimble 122. In one preferred and non-limiting embodiment or aspect, the one or more grooves 180 define a region of localized reduction in the diameter of the shear pin 140, such that the shear pin 140 is most likely to shear or break at the one or more grooves 180. The force necessary to shear or break the shear pin 140 may be predetermined to correspond to a typical force exerted on the fall protection apparatus 102 (shown in FIG. 1) by a falling user. In some aspects, the force necessary to shear the shear pin 140 may be between about 75 lbs and about 2520 lbs. The shear pin 140 may be made from metal, plastic, or a combination thereof.

Figure 7:
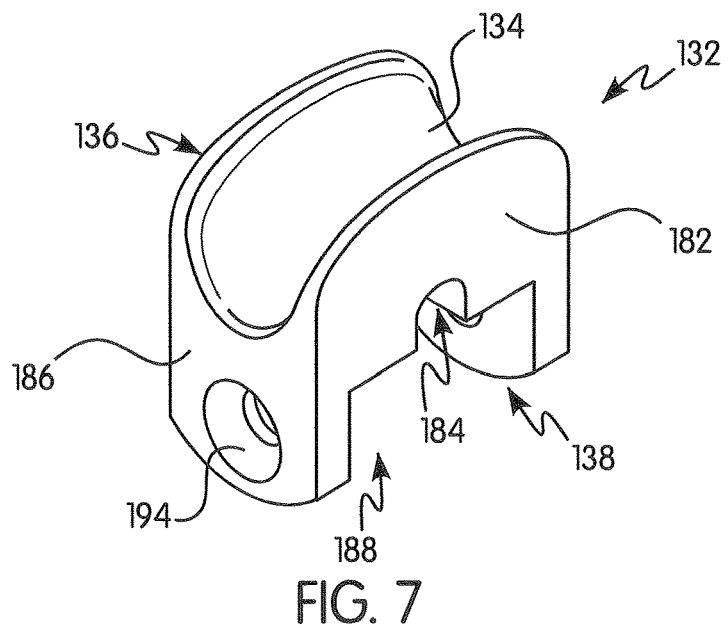
FIG. 7 is a perspective view of a saddle of a load indicator in accordance with the principles of the present invention.

With reference to FIG. 7, the saddle 132 is shown in accordance with one preferred and non-limiting embodiment or aspect of the present disclosure. The saddle 132 has a saddle body 182 having the upper end 136 and the lower end 138. In one preferred and non-limiting embodiment or aspect, the saddle 132 is substantially U-shaped and configured to be received within the pass-through opening 130, such that a main longitudinal length of the saddle 132 is oriented substantially perpendicularly relative to the thimble 122 and the looped portion 116 of the line 104. Desirably, the saddle 132 is shaped such that the saddle 132 may move vertically within the pass-through opening 130 but is retained by the sidewalls of the pass-through opening 130 from side-to-side movement. The saddle 132 has the grooved portion 134 on its upper end 136. The grooved portion 134 is shaped to correspond to at least a portion of the link 120 of the connector 110 (FIG. 2). In one preferred and non-limiting embodiment or aspect, the grooved portion 134 may extend substantially along an entire longitudinal length of the saddle 132.

During use, at least a portion of the link 120 engages the saddle 132 by contacting the grooved portion 134 (FIG. 2). The lower end 138 of the saddle 132 has a recess 184 configured for receiving at least a portion of the shear pin 140, such that any force that is exerted on the line 104 and/or the connector 110 is applied on the shear pin 140. The recess 184 is oriented substantially perpendicularly to a direction of the grooved portion 134. The lower end 138 of the saddle 132 is configured to be offset from the bottom 144 of the pass-through opening 130 of the thimble 122 (FIG. 2). A pair of lugs 186 protrudes from the lower end 138 of the saddle 132 to define a space 188 therebetween. A retaining pin 190 (shown in FIG. 2) is retained between the lugs 186. In use, the retaining pin 190 prevents the sheared portion of the shear pin 140 from falling out of the load indicator 100 if the shear pin 140 breaks due to a shock load on the load indicator 100 that exceeds the shear strength of the shear pin 140. The retaining pin 190 may be retained within the space 188 between the lugs 186 by the indicator cover 146 held in place by at least one fastening element, such as a pair of retaining screws 150 (FIG. 2) extending through the corresponding holes 194 extending through at least a portion of the lugs 186 and into the indicator cover 146.

Figure 3A:
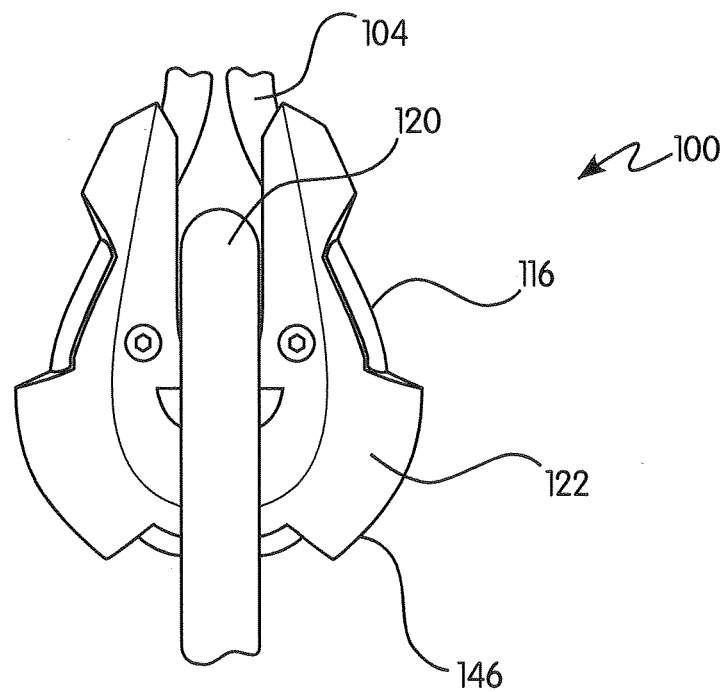
FIG. 3A is side view of the load indicator shown in FIG. 1 in a first, inactivated state.
Figure 3B:
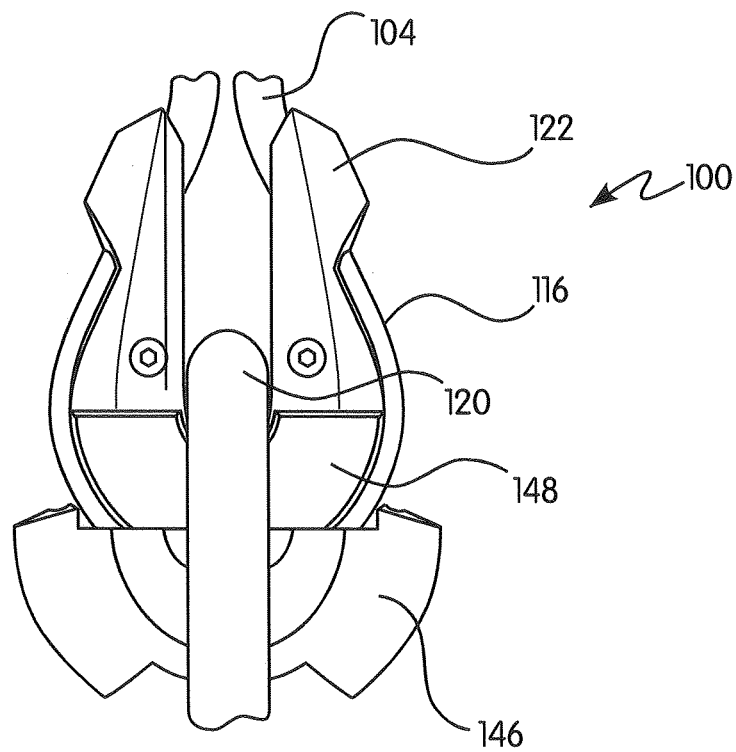
FIG. 3B is side view of the load indicator shown in FIG. 1 in a second, activated state.
Figure 8:
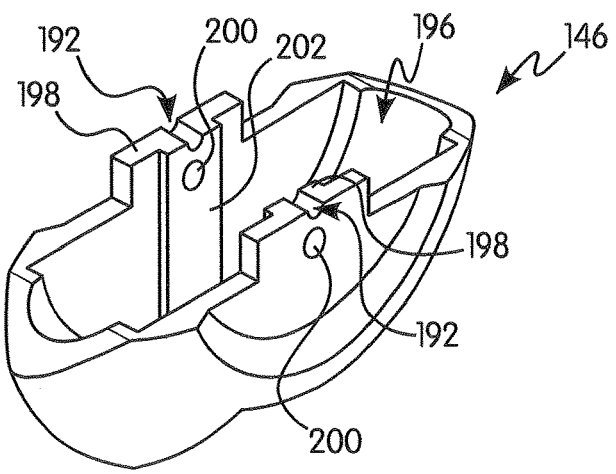
FIG. 8 is a perspective view of an indicator cover of a load indicator in accordance with the principles of the present invention.

With reference to FIG. 8, one preferred and non-limiting embodiment or aspect of the indicator cover 146 is illustrated in detail. In one preferred and non-limiting embodiment or aspect, the indicator cover 146 is configured to at least partially uncover the indicator region 148 of the thimble 122 upon activation of the load indicator 100 due to a shock load (FIG. 3B). Prior to activation of the load indicator 100, the indicator cover 146 desirably covers at least a portion of the indicator region 148 (FIG. 3A). In one preferred and non-limiting embodiment or aspect, the indicator cover 146 completely covers the indicator region 148 when the load indicator 100 has not been activated. The indicator cover 146 has a substantially semi-circular shape that may correspond to a shape of the lower end of the first and second portions 124, 126 of the thimble 122, and/or the lower end of the looped portion 116 of the line 104. The body of the indicator cover 146 defines an interior cavity 196 that is shaped to receive the indicator region 148 of the thimble 122. In some aspects, the interior cavity 196 may be shaped to receive the recessed region 155, 165 of the thimble 122 such that, in the inactivated state, the indicator cover 146 appears to be coextensive or uniformly formed with the thimble 122. In the activated state, the indicator cover 146 moves relative to the thimble 122 after the shear pin 140 is sheared to uncover at least a portion of the indicator region 148.

With continued reference to FIG. 8, and in one preferred and non-limiting embodiment or aspect, the indicator cover 146 may have at least one mounting structure 198 for connecting to the saddle 132. The mounting structure 198 may be in the form of a pair of protrusions that extend away from opposite sides of an upper surface of the body of the indicator cover 146. Each mounting structure 198 may have at least one opening 200 for receiving the retaining screw 150 that connects the indicator cover 146 to the saddle 132. A groove 192 in the indicator cover 146 may be provided to contain the retaining pin 190 between the indicator cover 146 and the saddle 132. The indicator cover 146 may further have a second guide member 202, such as a groove or a projection that corresponds to the first guide member 157, 167 on the recessed region 165 of the thimble 122. The first and second guide members 157, 167, 202 define a guide path for the indicator cover 146 to follow as the indicator cover 146 moves from a covering position (FIG. 3A) to an uncovering position (FIG. 3B) after the load indicator 100 has been activated.

Having described the structure of the load indicator 100, the method of operation of the load indicator 100 from an inactive to an active state will now be described. During normal operation of the fall protection apparatus, force is applied to the load indicator 100 between the line 104 at one end and the connector 110 at the other end (FIG. 1). In particular, force applied on the load indicator 100 is applied directly to the saddle 132 via the link 120 of the connector 110. As described herein, the saddle 132 rests on the shear pin 140 such that the force imposed on the saddle 132 is transferred directly to the shear pin 140. During normal operation, such as when the load on the fall protection apparatus 102 does not exceed a determined force necessary to shear the shear pin 140 (FIG. 3A), the lower end 138 of the saddle 132 engages the shear pin 140, such that the lower end 138 is offset from the bottom 144 of the pass-through opening 130 of the thimble 122 and the indicator cover 146 covers the indicator region 148 on the thimble 122. If a force greater than a force necessary to shear or break the shear pin 140 is exerted on the fall protection apparatus 102, such as during a fall (FIG. 3B), the shear pin 140 is sheared. Shearing of the shear pin 140 causes the lower end 138 of the saddle 132 to be no longer supported on at least a portion of the shear pin 136. Instead, the saddle 132 is free to move within the pass-through opening 130 of the thimble 122 and is urged toward the bottom 144 of the pass-through opening 130 due to the weight of the user exerted through the link 120 of the connector 110. As the saddle 132 moves to engage the bottom 144 of the pass-through opening 130 of the thimble 122, the indicator cover 146 also moves with the saddle 132 to uncover at least a portion of the indicator region 148 on the thimble 122. The uncovering of the indicator region 148 due to the movement of the indicator cover 146 provides a visual indication that the fall protection apparatus 102 has been used to arrest a fall and that the components of the fall protection apparatus 102 and the load indicator 100 should be inspected and replaced or repaired, as needed.

Although the disclosure has been described in detail for the purpose of illustration based on what is currently considered to be the most practical and preferred aspects, it is to be understood that such detail is solely for that purpose and that the disclosure is not limited to the disclosed aspects, but, on the contrary, is intended to cover modifications and equivalent arrangements. For example, it is to be understood that the present disclosure contemplates that, to the extent possible, one or more features of any aspect can be combined with one or more features of any other aspect.

What is claimed is:

1. A load indicator for use with a fall protection apparatus having a line and a connector for connecting to a user, the load indicator comprising:
    a housing having a pass-through opening and a covered indicator region, at least a portion of the housing configured for connecting to the line;
    a shear pin supported by the housing and extending across the pass-through opening; and
    a saddle extending across at least a portion of the pass-through opening and supported by at least a portion of the shear pin, the saddle configured for connecting to at least a portion of the connector,
    wherein the saddle is movable relative to the housing and within the pass-through opening between a first position, where the saddle is offset from a bottom of the pass-through opening, and a second position to contact the housing at the bottom of the pass-through opening when a force exceeding a predetermined threshold value is applied on the saddle causing the shear pin to shear or break, and
    wherein at least a portion of the indicator region is uncovered in the second position of the saddle when the shear pin shears or breaks.

2. The load indicator of claim 1, further comprising an indicator cover connected to at least a portion of the saddle such that the indicator cover covers the indicating region in the first position of the saddle and uncovers the at least a portion of the indicator region in the second position of the saddle.

3. The load indicator of claim 2, wherein the indicator cover has a mounting structure for releasably connecting the indicator cover to the saddle.

4. The load indicator of claim 2, wherein the indicator cover defines an interior cavity shaped to receive at least a portion of the indicator region of the housing.

5. The load indicator of claim 2, wherein the housing has a first guide member and the indicator cover has a second guide member for guiding a movement of the indicator cover to uncover the at least a portion of the indicator region with movement of the saddle from the first position to the second position.

6. The load indicator of claim 1, wherein the shear pin has an elongated, substantially cylindrical body with a first end and a second end offset from the first end along a longitudinal axis.

7. The load indicator of claim 6, wherein the first end and the second end of the shear pin are received within a receiving space on the housing.

8. The load indicator of claim 6, wherein the shear pin comprises one or more circumferential grooves recessed into the body between the first end and the second end.

9. The load indicator of claim 1, wherein at least a portion of the body of the shear pin is solid or hollow.

10. The load indicator of claim 1, wherein the saddle has an upper end with a grooved portion shaped to engage at least a portion of the connector.

11. The load indicator of claim 10, wherein the saddle has a lower end with a recess for receiving at least a portion of the shear pin.

12. The load indicator of claim 11, wherein the recess is oriented substantially perpendicularly to a direction of the grooved portion.

13. The load indicator of claim 10, wherein the lower end of the saddle is offset from a bottom of the pass-through opening of the housing.

14. The load indicator of claim 1, wherein the saddle has a pair of lugs protruding from the lower end with a space between the lugs.

15. The load indicator of claim 14, wherein a retaining pin is retained between the pair of lugs.

16. The load indicator of claim 1, wherein the housing has a unitary, monolithic structure.

17. The load indicator of claim 1, wherein the housing comprises a first part and a second part releasably connected together to surround at least a portion of an outer circumference of the line.

18. A load indicator for use with a fall protection apparatus having a line and a connector for connecting to a user, the load indicator comprising:
a housing having a pass-through opening and an indicator region, the housing configured for connecting to the line;
a shear pin supported by the housing and extending across the pass-through opening;
a saddle extending through at least a portion of the pass-through opening and offset from a bottom of the pass-through opening, the saddle being supported by at least a portion of the shear pin and configured for connecting to at least a portion of the connector;
an indicator cover movable relative to the housing between a first position, where the indicator cover covers the indicator region, and a second position, where the indicator cover uncovers at least a portion of the indicator region,
wherein the indicator cover is moved to the second position when a force exceeding a predetermined threshold value is applied to the saddle to shear or break the shear pin, and
wherein, in the second position, the saddle contacts the housing at the bottom of the pass-through opening.

19. A fall protection apparatus comprising:
a line having a first end and a second end;
a connector for connecting to a user; and
a load indicator positioned between the second end of the line and the connector, the load indicator comprising:
a housing having a pass-through opening and a covered indicator region, at least a portion of the housing connected to the second end of the line;
a shear pin supported by the housing and extending across the pass-through opening; and
a saddle extending across at least a portion of the pass-through opening and supported by at least a portion of the shear pin, the saddle connected to at least a portion of the connector,
wherein the saddle is movable relative to the housing and within the pass-through opening between a first position, where the saddle is offset from a bottom of the pass-through opening, and a second position to contact the housing at the bottom of the pass-through opening when a force exceeding a predetermined threshold value is applied on the saddle causing the shear pin to shear or break, and
wherein at least a portion of the indicator region is uncovered in the second position of the saddle.

20. The fall protection apparatus of claim 19, further comprising an indicator cover connected to at least a portion of the saddle such that the indicator cover covers the indicating region in the first position of the saddle and uncovers the at least a portion of the indicator region in the second position of the saddle.

* * * * *